2,927,027
Patented Mar. 1, 1960

2,927,027
FEED EFFICIENCY PROMOTING COMPOSITION

Euclid W. Bousquet and Howard E. Hoffman, Wilmington, Del., assignors to E. I. du Pont de Nemours and Company, Wilmington, Del., a corporation of Delaware No Drawing. Application November 20, 1957
Serial No. 697,541

3 Claims. (Cl. 99—2)

This invention relates to animal feed efficiency promoting compositions and methods employing as an essential active ingredient one or more compounds from the group including the salts, esters, amides, and cyclic monolactones and dilactones of 4,5-dihydroxy-2,4,6-octatrienedioic acid and its derivatives.

Substances which effectively stimulate the growth rate and increase the feed efficiency of animals have great value, particularly to the agricultural economy. Such substances can shorten the time normally necessary to rear animals for marketing by accelerating the rate of weight gained. They also can lower the cost of raising animals by improving feed efficiencies. It has been found that the growth rate and in particular the efficiency of feed utilization of animals can be markedly increased by the active ingredients of the present invention more particularly described below.

Animals whose feed efficiency can be promoted by the active ingredients of the present invention include livestock such as goats, mules, donkeys, horses, sheep, cattle, and swine, poultry such as ducks, chickens, geese and turkeys, household pets such as dogs and cats, experimental laboratory animals such as rats, monkeys, mice, guinea pigs and rabbits, commercially valuable animals such as mink, chinchillas and foxes as well as other domesticated and wild animals, including squirrels, skunks, beavers, etc.

The essential active ingredients necessary for the feed efficiency promoting compositions and methods of this invention are the salts, esters, amides, and cyclic lactones of 4,5-dihydroxy-2,4,6-octatrienedioic acid and its derivatives. These essential active ingredients include compounds represented by the formula:

(1)

$$X_1-\overset{O}{\overset{\|}{C}}-\overset{R}{\underset{R'}{C}}=C-\overset{Y_1}{\underset{R}{C}}-\overset{Y_2}{\underset{R'}{C}}-C=C-\overset{O}{\overset{\|}{C}}-X_2$$

wherein: R and R' can be the same or different and are selected from the group consisting of hydrogen; alkoxyaryl, especially where the alkoxy radical is not more than 12 carbon atoms and the aryl radical is hydrocarbon of not more than 10 carbon atoms; haloaryl, especially chloroaryl where the aryl radical is hydrocarbon of not more than 10 carbon atoms; and monovalent hydrocarbon radicals free from non-aromatic unsaturation, especially of not more than 12 carbon atoms, e.g., alkyl especially short chain alkyl, i.e. containing less than 7 carbon atoms, aryl especially where the aryl radical is hydrocarbon of not more than 10 carbon atoms, and aralkyl especially of not more than 7 carbon atoms; $X_1$ and $X_2$ can be the same or different and are selected from the group consisting of

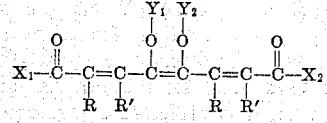

wherein $R_1$ and $R_2$ can be the same or different and are selected from the group consisting of hydrogen, monovalent hydrocarbon radicals free from non-aromatic unsaturation especially of not more than 18 carbon atoms such as, for example, alkyl and especially short chain alkyls containing less than 7 carbon atoms, haloalkyl, aralkyl, alkoxyl, aryl, haloaryl especially chloroaryl where the aryl radical is hydrocarbon of not more than 10 carbon atoms, and alkoxyaryl especially where the alkoxy radical is not more than 12 carbon atoms and the aryl radical is hydrocarbon of not more than 10 carbon atoms; $OR_3$ wherein $R_3$ is from the group consisting of hydrogen, monovalent hydrocarbon radicals free from non-aromatic unsaturation especially of not more than 12 carbon atoms such as, for example, alkyl and especially short chain alkyls containing less than 7 carbon atoms, haloalkyl, aralkyl, alkoxyl, aryl, haloaryl especially chloroaryl where the aryl radical is hydrocarbon of not more than 10 carbon atoms and alkoxyaryl especially where the alkoxy radical is not more than 12 carbon atoms and the aryl radical is hydrocarbon of not more than 10 carbon atoms, provided that only one of the $X_1$ and $X_2$ radicals can be OH in a single compound; and OM wherein M is a cation such as, for example, sodium, potassium, calcium, ammonium, quaternary ammonium, aluminum, nickelic, cobaltic, ferric, manganic, and cupric; and $Y_1$ and $Y_2$ can be the same or different and are selected from the group consisting of hydrogen and alkali metal, and monocyclic and dicyclic derivatives being represented by Formula 1 wherein $X_1$ and $Y_1$, or $X_2$ and $Y_2$, are removed to form the corresponding monolactone, or both of these combinations are removed to form the corresponding dilactone. Of the above compounds and cyclic derivatives, the di-gamma-lactone has particular advantages.

The compounds of the class est forth above have been only recently discovered. The compounds and methods for their preparation are described and claimed in U.S. applications, Serial Numbers 549,154 and 549,155, both filed November 25, 1955, said Serial Number 549,155 now U.S. Patent Number 2,840,570.

The unsaturated dilactones having the structure described above and in which R and R' are H are characterized in having specific absorption coefficients in the neighborhood of 3300 to 3400 angstroms of 200 to 224, melting points from 220° to 250° C., and having a hydrogen number, determined with palladium-on-charcoal, corresponding to about 3 moles of hydrogen per molecule. These dilactones can be prepared by reacting acetylene and carbon monoxide in an inert organic solvent in contact with a cobalt carbonyl catalyst. In one method of preparation, a pressure reactor is charged with an inert organic solvent, i.e., one free from active hydrogen. A catalytic amount of a cobalt carbonyl catalyst is added, the reactor is closed, cooled to 0° C., or lower, and evacuated. A predetermined amount of acetylene is then admitted from a storage vessel calibrated so that the amount of acetylene delivered is measured by the drop in pressure, and the reactor placed in a shaking device. Carbon monoxide is introduced to between 50 and 3000 atmospheres, usually 250 to 1000 atmospheres, and the charge heated and agitated at 60° to 175° C., usually 85° to 140° C. These conditions are maintained until there is no further reaction, as evidenced by cessation of pressure drop. Throughout the reaction period, the pressure within the reactor is maintained within the limits selected for operation by periodic injections of carbon monoxide.

After reaction is complete, the reactor is permitted to cool, unreacted acetylene and carbon monoxide are vented to the atmosphere, and the reaction mixture slurried with an inert organic solvent. The slurry is filtered and the residue on the filter extracted with a hot inert organic solvent. The extract is cooled and the crystalline product which separates is filtered and dried. An alternative method for isolating the desired dilactone is by heating the crude reaction product at 200° C. and 1–2 mm. pressure, and collecting the sublimate on a "cold finger."

In the formation of the dilactones, there are involved two moles of an acetylene and 4 moles of carbon monoxide. In practice, this ratio is attained by charging a weighed sample of the acetylene into the reactor and then injecting carbon monoxide in an amount sufficient to provide 2 moles thereof per mole of acetylene. Employing a 400 milliliter reactor and 25–30 grams of acetylene, the amount of carbon monoxide injected is that which will provide a total pressure in the range of 50–3000 atmospheres at reaction temperature. The reaction generally requires from 1 to 20 hours, although shorter or longer reaction times can be employed.

The reaction between the acetylene and carbon monoxide can be carried out batchwise or continuously in the presence of an inert organic liquid medium. By "inert organic liquid medium" is meant organic liquids which contain no active hydrogen, as determined by the Zerewitinoff method [Ber. 40, 2026 (1927); J. Am. Chem. Soc. 49, 3181 (1827)]. Thus, the acetylene is the only compound in the reaction system which may contain active hydrogen. Specific inert organic liquids are isooctane, toluene, acetonitrile, acetone, cyclohexanone, ethyl acetate, dioxane, diethyl ether, xylene, benzene, etc. The nitriles and ketones are in general preferred over the hydrocarbons and ethers.

The amount of solvent used can be varied over wide limits but generally it is at least equal to the weight of the acetylene charged into the reactor. An amount in excess of ten times the weight of the acetylene is commonly advantageous from the standpoint of yield, and even 20 or more times is sometimes preferred.

The catalysts used are the cobalt carbonyls and the compounds formed by reaction of cobalt carbonyl with electron donor solvents such as ketones and nitriles that fall within the definition of inert organic media given above. Cobalt acetylacetonate can be used as an equivalent for cobalt carbonyl. Cobalt carbonyl can be made by direct reaction of carbon monoxide with the metal in reactive form, as described in J. Am. Chem. Soc. 70, 383–6 (1948). The amount of catalyst employed is generally from 0.01 to 15% based on the acetylene charged into the reactor.

The dilactones suitable according to the present invention furthermore can exist in isomeric forms. Among the isomeric forms of the unsaturated dilactones can be mentioned the cis and trans forms of $[\Delta^{2,2'(5H,5'H)}]$-bifuran]-5,5'-dione, as follows:

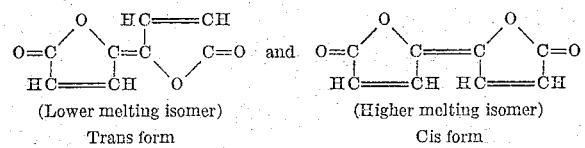

(Lower melting isomer)     (Higher melting isomer)
Trans form                 Cis form The lower melting isomer has a melting point of 230°–237° C. and the higher melting isomer has a melting point of 240°–248° C., determined in a capillary tube in an electrically heated melting point apparatus. The isomers can be recrystallized repeatedly from methyl ethyl ketone to give samples melting at 235° and 247° C., respectively, when a setting is used such that the temperature increases from 175° to 200° C. in 6 minutes, from 200° to 225° C. in 9 minutes, and from 225° to 247° C. in 11 minutes. The melting is generally accompanied by sublimation and decomposition.

The two isomers are further distinguished by their ultraviolet absorption; the pure lower melting isomer has its maximum absorption at about 3400 A. and its specific absorbance, $k_{3400\,A.}$ is 200–204. The pure higher melting isomer has its maximum absorption at about 3350 A. and its specific absorbance $k_{3340\,A.}$ is 220–224.

The low melting isomer can be isomerized to the high melting or cis form by treating it with sulfuric or phosphoric acid or pyridine. The cis isomer can also be obtained from the trans isomer by recrystallization of the trans isomer from dimethylformamide. It can also be produced directly from carbon monoxide and acetylene by including hydrogen sulfide or a strong acid in the reaction mixture.

The alkali metal salts of 4,5-dihydroxy-2,4,6-octatrienedioic acid esters, having a structure of Formula 1 wherein $X_1$ and $X_2$ are $OR_3$ and wherein $Y_1$ and $Y_2$ are alkali metal, are formed when a dilactone, prepared for example as described above, is treated with an alkali metal alkoxide in alcoholic medium.

A monolactone monoester having the structure of Formula 1 can be obtained by acidifying the alkali metal salts of the diesters referred to in the preceding paragraph. The other monolactone compounds having a structure of Formula 1 can be prepared by subjecting a dilactone of the type described above to reaction with the basic reagent and then acidifying the resulting reaction mixture. When the basic reagent is an aqueous alkali metal hydroxide, there is obtained, on acidification, the monolactone acid. When the basic reagent is alcoholic alkali metal alkoxide, there is obtained on acidification a monolactone monoester. When the basic reagent is ammonium hydroxide, or a primary or secondary monoamine, there is obtained on acidification a monolactone monoamide. The monolactone acid salts, the monolactone monoesters, and the monolactone monoamides are hydrolyzable to the corresponding monolactone acids.

The monolactone monoamides and the monolactone monoesters of Formula 1 are shown by infrared data to be gamma-monolactones, while the monolactone acids are shown to be delta-monolactones.

In the preparation of the monolactone compounds referred to above, the basic reagent is not especially critical and can include such usefully employable hydrolytic agents as ammonium, sodium, potassium, and lithium hydroxides, mono- and dibutylamines, mono- and dioctylamines, N-methylaniline, N-octylamine, N-cyclohexylaniline, benzylamine, N-methylbenzylamine, cyclohexylamine, N-cyclohexylaniline, toluidines, xylylamines, sodium ethoxide, potassium butoxide, sodium dodecyloxide, aminotoluic acids, dimethylamine, octadecylamine, p-anisidine, piperidine, morpholine, and other monoamines having hydrogen attached to amino nitrogen with the amino group as the sole functional group reactive toward carboxyl.

The hydrolysis of the dilactone can be effected at temperatures varying from normal room temperature to reflux at atmosphere pressure. The hydrolytic agent and dilactone are used in at least 1:1 molar amounts. In practice, however, it is preferred to use amounts of the hydrolytic agent which are several times the molar amount of the dilactone present in the reaction mixture. The hydrolysis is usually effected in the presence of a reaction medium and suitable media include water, alcohols, such as methanol, ethanol, etc.; ethers, such as dioxane; hydrocarbons, such as benzene, toluene, xylene, isooctane, and the like.

The strength of the acid used in acidifying the reaction mixture after hydrolysis with aqueous alkali metal or alkaline earth metal hydroxide determines the nature of the product obtained. Thus, with hydrochloric acid, the product can be the monosodium salt of the monolactone acid, while with acetic acid it is the monosodium salt of the open chain acid.

The amount of reaction medium is not critical but for convenience of operation an amount is usually employed which exceeds the combined weight of the reactants by several fold. The reaction medium can be a solvent for the dilactone and hydrolytic reactant or it can be a solvent for one and not for the other.

The examples given below illustrate methods of synthesis of compounds involved in the present invention and serve to exemplify for those having ordinary skill in the art techniques for the preparation of the active ingredients of the present invention.

*Example A*

A 400 milliliter stainless steel shaker tube is flushed with nitrogen and charged with 100 milliliters of acetonitrile containing one gram of cobalt carbonyl. The tube is closed, cooled in solid carbon dioxide/methanol, and nitrogen is removed by evacuation. By means of a calibrated reservoir, 26 grams of acetylene, previously passed through two towers containing activated alumina and sodium hydroxide, is added to the shaker tube. The shaker tube is placed in an electrically heated box which is shaken vigorously. Carbon monoxide in introduced into the shaker tube, as the tube is warmed up, and the actual reaction is carried out at 110° C. during 15 hours at a pressure varying from 700 to 900 atmospheres. Carbon monoxide is added periodically as required to maintain this pressure. The carbon monoxide absorption is quite brisk, especially during the early stages of the run. A duplicate run is made and the two runs composited for work up. The reaction mixture is slurried with ether and filtered. The moist precipitate weighs 130.5 grams. The precipitate is extracted with hot acetonitrile and this extract upon cooling on ice deposits 13 grams of brick red crystals, melting at 220° C. After recrystallization from ethyl acetate, the product has an ultraviolet absorption maximum in acetonitrile of 3400 angstroms. The compound is the dilactone [$\Delta^{2,2'(5H,5'H)}$]-bifuran]-5,5'-dione and shows a strong absorption in the infrared at 5.65 microns for lactone carbonyl unsaturation and a single very strong band at 6.50 microns due to >C=C< unsaturation.

*Example B*

A solution in 200 ml. of concentrated ammonium hydroxide of 15.5 grams of the dilactone prepared as in Example A is prepared by stirring with gentle warming for a few minutes. The orange-brown solution is filtered and acidified with concentrated hydrochloric acid with external cooling. The yellow precipitate weighs 4.0 grams when dry and is soluble in dilute aqueous sodium hydroxide. The product is the gamma-monolactone monoamide of 4,5-dihydroxy-2,4,6-octatrienedioic acid.

*Example C*

To 200 milliliters of 10% sodium hydroxide, there is added at room temperature 36.6 grams of the dilactone prepared as in Example A. Solution occurs exothermally in a few minutes. The solution is filtered and acidified with concentrated hydrochloric acid to give a yellow precipitate which weighs 40 grams after drying in a vacuum oven at 60° C. The compound is soluble in 5 sodium bicarbonate solution and corresponds in structure to the delta-lactone monoacid of 4,5-dihydroxy-2,4,6-octatrienedioic acid.

*Example D*

To 60 grams of the unsaturated dilactone prepared as in Example A is added 450 milliliters of 10% aqueous sodium hydroxide and the mixture warmed until solution results. The solution is then filtered to remove 3.2 grams of unchanged dilactone. The filtrate is poured into a solution of 100 milliliters of acetic acid in 900 milliliters of water. After scratching the walls of the container with a glass rod, there separates 46.7 grams (61%) of a yellow-orange solid. This product is the monosodium salt of the open chain acid, 4,5-dihydroxy-2,4,6-octatrienedioic acid.

*Example E*

Metal salts are precipitated from aqueous solutions of the monosodium salt prepared as in Example D by addition of the proper cation. Suitable exemplary salts include sodium, potassium, calcium, ammonium, quaternary ammonium, aluminum, nickelic, cobaltic, ferric, manganic, cupric, etc. Thus, heavy metal salts of 4,5-dihydroxy-2,4,6-octatrienedioic acid can be made by adding the appropriate cation to a solution of 0.35 gram of the monosidum salt of the acid in 10 milliliters of water. In exemplary procedures, metal salts added to obtain the appropriate metal cation and the color of the resultant product are given as follows:

| Salt Added | Color of Product |
|---|---|
| $Ni(NO_3)_2$ | Yellow. |
| $Co(OA_c)_2$ | Yellow-Orange. |
| $MnSO_4$ | Yellow. |
| $Al(OA_c)_3$ | Do. |
| $FeCl_3$ | Dark Brown. |
| $Cu(OA_c)_2$ | Pale Green. |
| $Ba(OH)_2$ | Yellow. |

*Example F*

A solution is prepared by stirring together 15.3 grams (0.093 mole) of a dilactone prepared as in Example A, and a solution of 5.2 grams (0.096 mole) of sodium methoxide in 200 milliliters of methanol. To this mixture glacial acetic acid (6 milliliters) is added and the yellow precipitate (15.7 grams) collected and dried. By chilling the filtrate, another 1.1 grams is obtained. The total yield is 16.8 grams (92%). The compound is sparingly soluble in water and does not react with dilute sodium bicarbonate solution. The compound can be readily purified by recrystallization from methanol or methyl ethyl ketone and is the gamma-monolactone monomethyl ester of 4,5-dihydroxy-2,4,6-octatrienedioic acid.

Illustrative of the salts, esters, amides, and cyclic monolactones and dilactones of 4,5-dihydroxy-2,4,6-octatrienedioic acid and its derivatives employed in the growth promoting compositions and methods of the invention are the following:

4,5-dihydroxy-2,4,6-octatrienedioic acid, monosodium salt 4,5-dihydroxy-2,4,6-octatrienedioic acid, ammonium salt 4,5-dihydroxy-2,4,6-octatrienedioic acid disodium salt 4,5-dihydroxy-cis-2,cis-4,cis-6-octatrienedioic acid, di-gamma-lactone 4,5-dihydroxy-cis-2,trans-4,cis-6-octatrienedioic acid, di-gamma-lactone 2,6 - bis(p-chlorophenyl)-4,5-dihydroxy-cis-2,trans-4,cis-6-octatrienedioic acid, di-gamma-lactone 3,7 - bis(p-chlorophenyl)-4,5-dihydroxy-cis-2,trans-4,cis-6-octatrienedioic acid, di-gamma-lactone 4,5-dihydroxy-2,6-di-2-naphthyl-cis-2,trans-4,cis - 6 - octatrienedioic acid, di-gamma-lactone 4,5-dihydroxy-3,7-di-2-naphthyl-cis-2,trans-4,cis - 6 - octatrienedioic acid, di-gamma-lactone 4,5 - dihydroxy-2,6-diphenyl-cis-2,trans-4,cis-6-octatrienedioic acid, di-gamma-lactone 4,5 - dihydroxy-3,7-diphenyl-cis-2,trans-4,cis-6-octatrienedioic acid, di-gamma-lactone 2,6-bis(o-methoxyphenyl)-4,5-dihydroxy-cis-2,trans-4,cis - 6-octatrienedioic acid, di-gamma-lactone 3,7-bis(o-methoxyphenyl)-4,5-dihydroxy-cis-2,trans-4,cis-6-octatrienedioic acid, di-gamma-lactone 2,6-dibutyl-4,5-dihydroxy-cis-2,trans-4,cis - 6 - octatrienedioic acid, di-gamma-lactone 3,7-dibutyl-4,5-dihydroxy-cis-2,trans - 4,cis - 6 - octatrienedioic acid, di-gamma-lactone 4,5 - dihydroxy - 2,6-dimethyl-cis-2,trans-4,cis-6-octatrienedioic acid, di-gamma-lactone 4,5 - dihydroxy-3,7-dimethyl-cis-2,trans-4,cis-6-octatriene-
dioic acid, di-gamma-lactone
(p-Carboxyphenyl)-4,5-dihydroxy-cis-2,trans-4,cis-6-octa-
trienediamide
4' - carboxy-4,5-dihydroxy-cis-2,trans-4,cis-6-octatrienedi-
oanilic acid-gamma-lactone
N-butyl-4,5-dihydroxy-2,4,6-octatrienedioamic acid-gam-
ma-lactone
4,5-dihydroxy-N,N-dimethyl-2,4,6-octatrienedioamic acid-
gamma-lactone
4,5-dihydroxy-cis - 2,trans - 4,cis - 6 - octatrienedioic acid,
methyl ester ammonium deriv.
Cis-2,4,cis-6-octatrienedioamic acid-4,5-dihydroxy-N-iso-
butyl-gamma-lactone
4,5 - dihydroxy-2,4,6-octatrienedioic acid-gamma-lactone
methyl ester The growth modifying and feed efficiency promoting compositions of this invention are prepared by admixing in an amount sufficient to promote animal feed efficiency one or more of the compounds defined heretofore, with appropriate animal feed compositions. Such compositions can contain a variety of nutriments and adjuvants known and used in the art of animal husbandry in order to provide formulations adapted for ready and efficient administration to various animals of the type recited hereinbefore. Thus, the feed efficiency promoting compositions can be prepared in the form of either powdered solids or liquids.

Powdered or dust compositions of the invention are prepared by mixing one or more of the animal feed efficiency promoting compounds of this invention with finely divided solids, preferably flours, such as wheat, corn, soya bean and cotton-seed. Also, ground oyster shells can be used, as well as finely divided attapulgite or bentonite. These last mentioned substances also act as solid dispersing agents.

Where one or more water immiscible oils, such as coconut, olive, cotton-seed, and peanut oil, are used as a solvent for the active feed efficiency promoting agent, the water, oil and emulsifying agent constitute an aqueous emulsion carrier. Another technique is to dissolve the active feed efficiency promoting compound in an organic solvent, such as ethanol, acetone, or isopropylacetate, disperse the resultant solution in a feed composition, and then dry the feed to remove the solvent.

Thus, the compositions of this invention can be used either in a liquid state or in a solid state. They can, for example, be used in a concentrated form as part of an entire ration, as a powder, mash, pellet, capsule, tablet or other dry, semi-dry or liquid feed composition. The percentage by weight of the essential active feed efficiency promoting ingredient will vary according to the manner in which the particular composition is to be applied but, in general, such percentage will be about 0.5% to 95% by weight of the feed efficiency promoting concentrate composition.

Both the solid and liquid feed efficiency promoting compositions can contain one or more surface-active agents in an amount sufficient to render the composition readily dispersible in water. Such agents are particularly useful if the compositions are to be dispersed in water or diluted with water before use. The agents can be of the anionic, cationic, or non-ionic type. Suitable agents include glycerol and sorbitan esters of fatty acids. Lecithin and polyoxyethylene sorbitan mono-oleate can be used. Thus, there can be used a product known as "Tween" 80, which is a polyoxyethylene sorbitan mono-oleate with 20 moles of ethylene oxide for each mole of sorbitan. Generally, the surface-active agent used will not comprise more than about 5 to 15% by weight of a composition, and in some compositions the percentage will be 1% or less.

The amount of feed efficiency promoting active ingredient present in the compositions as fed to animals will vary with the type of animal involved, the feed efficiency promoting activity of the particular feed efficiency promoting ingredient involved, the purpose for which the application is being made (i.e., short term or long term stimulation), the manner of application, and like variables. The optimum dosages required must be determined from a consideration of all factors involved. Certain of the specific examples which follow will illustrate various kinds and amounts of application and the results obtained thereby. Oral administration or feeding of an effective dosage is the preferred method of use. In general, the exact amounts of the compounds used in a feed composition depend upon the food consumption and eating habits of the animal concerned. In general, and in particular for fowl and other domestic livestock, the preferred dosage is between about 0.001% and 1.0% by weight of the active feed efficiency promoting compounds in the feedstuff, i.e., the feed composition. A particularly preferred range is 0.001% to 0.10%. A particular concentration of active ingredient can be readily selected by persons skilled in the art in the light of the attendant circumstances and the nature of the effect desired in accordance with the teachings set forth herein.

If the feed efficiency promoting compositions are to be formulated without regard to the amount to be used in a feed composition for a specific animal, the compositions of the invention can be prepared in concentrated form suitable for dilution before administration.

Depending upon the eating habits and needs of the particular animal involved, the diets of an animal receiving the feed efficiency promoting composition of the present invention should be a normal, well-balanced one containing proper amounts of proteins, carbohydrates, fats, and mineral matter, supplemented with vitamins and antibiotics, as will be readily understood. Facts concerning the nutrition, feeding, care, and husbandry of the various classes of farm animals can be found in the book "Feeds and Feeding" by Frank B. Morrison, published by the Morrison Publishing Company of Ithaca, New York, 1948 (21st Ed.).

Where the feed efficiency promoting compounds are to be placed in drinking water, good results are obtained at concentrations of the compounds comparable to those employed when the compounds are substituents in a food composition.

In order that the invention can be better understood, the following examples are given in addition to the examples already set forth above. The examples illustrate typical feed efficiency promoting compositions of the invention, methods for their preparation, feed efficiency promoting applications, and the results obtained. Those skilled in the art will appreciate that other feed efficiency promoting compositions according to this invention can be prepared and applied in accordance with these examples. Thus, the examples are herein given for clearness of understanding only and no unnecessary limitations are to be understood therefrom.

*Example 1.*—A basal diet having a protein content calculated at 21% protein was prepared composed of the following ingredients:

| | Percent |
|---|---|
| Yellow corn, ground | 50.5 |
| Solvent extracted soya bean oil meal | 23.0 |
| Alfalfa meal (dehydrated) | 4.0 |
| Fish meal | 4.0 |
| Liver and glandular meal | 4.0 |
| Whey, dry | 4.0 |
| Corn oil | 4.5 |
| Cod liver oil (U.S.P.) | 1.0 |
| Salt mixture | 4.0 |
| Vitamin mixture | 1.0 |

Thirty weanling female rats were separated into three groups of ten rats each on the basis of litter mates and body weights. Group A had a starting weight of 52.8 grams, Group B 51.9 grams and Group C 51.2 grams. Over a period of five weeks, Group A was fed only the above basal diet. Group B received the above basal diet admixed with 1 gram of 4,5-dihydroxy-cis-2,trans-4,cis-6-octatrienedioic acid, di-gamma-lactone, which can also be referred to as the transform of[$\Delta^{2,2'(5H,5'H)}$-bifuran]-5,5'-dione, per kilogram of the basal diet. The dilactone had been incorporated into the feed by mechanical mixing. Group C received the above basal diet admixed with 0.10 gram of the dilactone per kilogram of feed. All three groups of rats were maintained in a temperature controlled environment in individual cages for the entire five week period. Feed consumption and body weights were recorded once each week. At the end of the five week test period, a marked improvement was noted in feed efficiency in the rats fed the dilactone, as can be seen from the following recorded data:

| | Group A (Average per animal) | Group B (Average per animal) | Group C (Average per animal) |
|---|---|---|---|
| Gain_____grams__ | 165 | 167 | 158 |
| Food Consumption_____do____ | 612 | 576 | 548 |
| Feed Efficiency_____ | 3.71 | 3.45 | 3.47 |

*Example 2.*—Example 1 was repeated, except that five groups of rats were used, one receiving only the basal diet of Example 1 and the other four groups receiving the basal diet admixed with a feed efficiency promoting compound according to this invention. The particular feed efficiency promoting compounds used and their concentration in the basal diet, together with the resultant recorded data, is as follows:

| Group | Diet | Gain in Weight (Average per animal) | Feed Consumed (Average per animal) | Feed Efficiency (Average per animal) |
|---|---|---|---|---|
| | | Grams | Grams | |
| A_____ | Basal diet only_____ | 153 | 563 | 3.68 |
| B_____ | Basal diet with 0.01% by weight 4,5-dihydroxy-2(and 3), 6(and 7)-dimethyl-cis-2, trans-4, cis-6-octatrienedioic acid, di-gamma-lactone. | 161 | 503 | 3.11 |
| C_____ | Basal diet with 0.01% by weight 4'-chloro-4-(p-chloroanilino)-5-hydroxy-2,4,6-octatrienedioanilic acid - gamma - lactone hydrate. | 152 | 530 | 3.49 |
| D_____ | Basal diet with 0.01% by weight 4,5-dihydroxy-cis-2,cis-4, cis-6-octatrienedioic acid, di-gamma-lactone. | 145 | 509 | 3.52 |
| E_____ | Basal diet with 0.01% by weight 4,5-dihydroxy-2,4,6-octatrienedioic acid, di-sodium salt. | 152 | 534 | 3.51 |

*Example 3.*—Example 2 was repeated except that the test was carried out over a four week period using three groups of rats, with the diets and results shown in the following table:

| Group | Diet | Gain in Weight (Average per animal) | Feed Consumed (Average per animal) | Feed Efficiency (Average per animal) |
|---|---|---|---|---|
| | | Grams | Grams | |
| A_____ | Basal diet only_____ | 138 | 477 | 3.45 |
| B_____ | Basal diet with 0.1% by weight 4,5-dihydroxy-2(and 3), 6(and 7)-diphenyl-cis-2, trans-4, cis-6-octatrienedioic acid, di-gamma-lactone. | 137 | 468 | 3.42 |
| C_____ | Basal diet with 0.01% by weight 4,5-dihydroxy-2(and 3), 6(and 7)-di-2-naphthyl-cis-2, trans-4, cis-6-octatrienedioic acid, di-gamma-lactone. | 138 | 472 | 3.41 |

In a similar manner, the following feed efficiency promoting compounds were admixed with the basal diet of Example 1, at a concentration of 0.10% by weight. When administered to the diet of animals, outstanding improvement in feed efficiency and growth resulted:

*Example 4.*—2(and 3),6(and 7)-dibutyl-4,5-dihydroxy-cis-2,trans-4,cis-6-octatrienedioic acid, di-gamma-lactone.

*Example 5.*—4,5 - dihydroxy-cis-2,trans-4,-cis-6-octatrienedioic acid, di-gamma-lactone/2,3-dimethylbutadiene 1:1 adduct.

*Example 6.*—4,5 - dihydroxy - cis-2,trans-4,cis-6-octatrienedioic acid, di-gamma-lactone/1,6-hexanediamine 1:1 reaction product.

*Example 7.*—4,5 - dihydroxy - cis-2,trans-4,cis-6-octatrienedioic acid, di-gamma-lactone/2,5-dimethylpiperazine 1:1 reaction product.

*Example 8.*—2,2' - dihydroxy - 2,2' - bifuran - 5,5'-(2H,2'H)-dione.

*Example 9.*—This example was carried out to demonstrate the outstanding feed efficiency improvement due to incorporation into animal feed of 4,5-dihydroxy-cis-2,trans-4,cis-6-octatrienedioic acid, di-gamma-lactone at different protein concentrations in the diet of the animal.

Two diets were prepared: Diet A was identical to the basal diet described in Example 1 and contained 21% protein. The second diet, Diet B, had a protein content calculated at 11% and was composed of the following ingredients:

| | Percent |
|---|---|
| Corn gluten meal and essential amino acids _____ | 23.9 |
| Cerelose _____ | 35.0 |
| Celluflour _____ | 22.8 |
| Crisco _____ | 9.3 |
| Cod liver oil _____ | 2.0 |
| Mineral mix (containing all required minerals) ____ | 5.0 |
| Vitamin mix (containing all required vitamins) ___ | 2.0 |

Six groups each containing eight female weanling rats were each housed in individual cages, such that feed consumption and body weight could be carefully observed. Diet A was fed to Groups A, B and C, with the Diet A fed to Group B containing 0.1% by weight of the di-gamma-lactone and the Diet A fed to Group C containing 0.01% of the di-gamma-lactone. Diet B was fed to Groups D, E and F, with the diet B fed to Group E containing 0.10% of the di-gamma-lactone and the Diet B fed to Group F containing 0.01% by weight of the di-gamma-lactone. The rats were maintained in an air-conditioned room. At the end of five weeks, an outstanding improvement in feed efficiency was observed in those animals whose diet contained the di-gamma-lactone, particularly at the 0.10% level. The following data were recorded:

| Group | Feed Consumed (Average per animal) | Gain in Weight (Average per animal) | Feed Efficiency (Average per animal) |
|---|---|---|---|
| | Grams | Grams | |
| A | 499 | 134 | 3.72 |
| B | 515 | 145 | 3.56 |
| C | 519 | 144 | 3.60 |
| D | 602 | 138 | 4.36 |
| E | 569 | 135 | 4.22 |
| F | 560 | 130 | 4.32 |

*Example 10.*—This example was carried out to demonstrate the outstanding feed efficiency improvement due to incorporation in a commercial swine feed animal diet (20% protien sow and pig feed) of 4,5-dihydroxy-cis-2,trans-4,cis-6-octatrienedioic acid, di-gamma-lactone.

Twenty female weanling rats were separated into two groups containing ten rats each. Group A was fed a basal swine feed diet made from wheat flour middlings, corn meal, oats, alfalfa meal, soybean meal, meat scraps, animal fat, and supplemented with vitamins, minerals and antibiotics. The animal fat was preserved with antioxidants. Group B was fed the basal swine feed diet containing 0.1% by weight of the di-gamma-lactone. After a period of five weeks, the following were recorded:

| Group | Gain in Weight (Average per animal) | Feed Consumed (Average per animal) | Feed Efficiency (Average per animal) |
|---|---|---|---|
| | Grams | Grams | |
| A | 140 | 572 | 4.09 |
| B | 142 | 533 | 3.75 |

*Example 11.*—A standard pig primer diet consisting of 20% protein and made up mainly of corn, alfalfa meal, brown barley, soybean oil meal, supplemented with vitamins and yeast, was fed to two groups of male weanling pigs (Yorkshires), five animals per group. One group received basal diet only; the other group was fed the basal diet containing 0.1% by weight of 4,5-dihydroxy-cis-2,trans-4,cis-6-octatrienedioic acid, di-gamma-lactone. The experimental group receiving the feed efficiency promoter showed an improved feed efficiency at five and ten weeks. The data are as follows:

| Diet | Five Weeks | | Ten Weeks | |
|---|---|---|---|---|
| | Gain in Weight (Average per animal) | Feed Efficiency (Average per animal) | Gain in Weight (Average per animal) | Feed Efficiency (Average per animal) |
| | Kg. | | Kg. | |
| Basal only | 39.85 | 2.32 | 96.00 | 2.87 |
| Basal with 0.1% di-lactone | 45.00 | 2.27 | 99.60 | 2.75 |

*Example 12.*—Two groups each containing 32 one-day old male chicks of crossed strain (Lancaster males × Nichols #12 females) were fed a practical corn-soybean meal basal diet supplemented with vitamins and antibiotics. To one of the diets, 0.01% by weight of 4,5-dihydroxy-cis-2,trans-4,cis-6-octatrienedioic acid, di-gamma-lactone was added, while the other group received no such additive. The birds were maintained in wire-floored electrically heated brooders. At the end of four weeks, the chicks were weighed and feed consumption data recorded. The following figures were obtained:

| Diet | Gain in Weight (Average per animal) | Feed Efficiency (Average per animal) | Index of Performance (Average gain of weight per animal/Average feed efficiency per animal) |
|---|---|---|---|
| | Grams | | Grams |
| Basal only | 366 | 1.94 | 189 |
| Basal with 0.01% di-lactone | 372 | 1.86 | 200 |

*Example 13.*—Two groups of Holstein calves, three males per group, are compared for eight weeks as to their feed consumption and weight gain. Both groups are fed calf starter with occasional supplements of leafy hay. To the diet of one group is added 0.01% by weight of 4,5-dihydroxy-cis-2-trans-4,cis-6-octatrienedioic acid, di-gamma-lactone. At the end of eight weeks, the calves receiving the growth stimulant according to this invention show a gain of 7% more weight and demonstrate a marked improvement in feed efficiency on the basis of calf starter meal consumed per pound gained.

The above and similar examples can be carried out in accordance with the teachings of this invention by substituting one or more other active feed efficiency promoting compounds within the scope of this invention for the feed efficiency promoting compounds recited in the above examples, and substituting other diets for the exemplary diets recited above. Thus, the foregoing detailed description has been given for clearness of understanding only and no unnecessary limitations are to be understood therefrom.

The invention claimed is:

1. The method of promoting animal feed efficiency which comprises incorporating in an animal feed at least one compound in an amount sufficient to promote animal feed efficiency, said compound selected from the following groups:

(1) A compound represented by the formula:

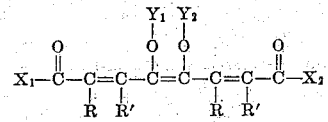

wherein: R and R' are selected from the group consisting of hydrogen, alkoxyaryl, haloaryl, and monovalent hydrocarbon radicals free from non-aromatic unsaturation; $X_1$ and $X_2$ are selected from the group consisting of

wherein $R_1$ and $R_2$ are selected from the group consisting of hydrogen, monovalent hydrocarbon radicals free from non-aromatic unsaturation, haloalkyl, aralkyl, alkoxyl, aryl, haloaryl, and alkoxyaryl; $OR_3$ wherein $R_3$ is selected from the group consisting of hydrogen, monovalent hydrocarbon radicals free from non-aromatic unsaturation, haloalkyl, aralkyl, alkoxyl, aryl, haloaryl, and alkoxyaryl, provided that only one of the $X_1$ and $X_2$ radicals are OH in a single compound; and OM wherein M is a cation; and $Y_1$ and $Y_2$ are selected from the group consisting of hydrogen and alkali metal;

(2) Monocyclic monolactone derivatives of compounds of said formula wherein $X_1$ and $Y_1$ are removed to form the corresponding monolactone;

(3) Monocyclic monolactone derivatives of compounds of said formula wherein $X_2$ and $Y_2$ are removed to form the corresponding monolactone; and (4) Dicyclic dilactone derivatives of compounds of said formula wherein $X_1$ and $Y_1$, and $X_2$ and $Y_2$, are removed to form the corresponding dilactone.

2. Animal feed composition comprising an animal feed and, in an amount sufficient to promote animal feed efficiency, at least one compound selected from the following groups:

(1) A compound represented by the formula:

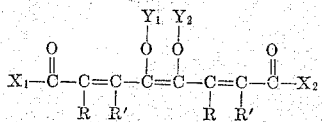

wherein: R and R' are selected from the group consisting of hydrogen, alkoxyaryl, haloaryl, and monovalent hydrocarbon radicals free from non-aromatic unsaturation; $X_1$ and $X_2$ are selected from the group consisting of

wherein $R_1$ and $R_2$ are selected from the group consisting of hydrogen, monovalent hydrocarbon radicals free from non-aromatic unsaturation, haloalkyl, aralkyl, alkoxyl, aryl, haloaryl, and alkoxyaryl; $OR_3$ wherein $R_3$ is selected from the group consisting of hydrogen, monovalent hydrocarbon radicals free from non-aromatic unsaturation, haloalkyl, aralkyl, alkoxyl, aryl, haloaryl, and alkoxyaryl, provided that only one of the $X_1$ and $X_2$ radicals are OH in a single compound; and OM wherein M is a cation; and $Y_1$ and $Y_2$ are selected from the group consisting of hydrogen and alkali metal;

(2) Monocyclic monolactone derivatives of compounds of said formula wherein $X_1$ and $Y_1$ are removed to form the corresponding monolactone;

(3) Monocyclic monolactone derivatives of compounds of said formula wherein $X_2$ and $Y_2$ are removed to form the corresponding monolactone; and (4) Dicyclic dilactone derivatives of compounds of said formula wherein $X_1$ and $Y_1$, and $X_2$ and $Y_2$, are removed to form the corresponding dilactone.

3. A feed efficiency promoting composition comprising an animal feedstuff and a feed efficiency promoting amount of 4,5-dihydroxy-cis-2,trans-4,cis-6-octatrienedioic acid, di-gamma-lactone.

No references cited.